(12) United States Patent
Ramsdell et al.

(10) Patent No.: US 8,146,129 B2
(45) Date of Patent: Mar. 27, 2012

(54) APPARATUS AND METHOD FOR PROVIDING VIDEO CONTENT AND SUPPLEMENTAL INFORMATION TO A CLIENT OVER A SWITCHED DIGITAL VIDEO CONTENT-BASED NETWORK

(75) Inventors: Scott W. Ramsdell, Charlotte, NC (US); Thomas Gonder, Tega Cay, SC (US)

(73) Assignee: Time Warner Cable Inc., New York, NY (US)

( * ) Notice: Subject to any disclaimer, the term of this patent is extended or adjusted under 35 U.S.C. 154(b) by 744 days.

(21) Appl. No.: 11/941,153

(22) Filed: Nov. 16, 2007

(65) Prior Publication Data

US 2009/0133084 A1   May 21, 2009

(51) Int. Cl.
*H04N 7/173* (2011.01)
(52) U.S. Cl. .......... 725/116; 725/93; 725/115; 709/219
(58) Field of Classification Search ............ 725/87–116; 709/217–232
See application file for complete search history.

(56) References Cited

U.S. PATENT DOCUMENTS

| | | | |
|---|---|---|---|
| 6,314,572 B1* | 11/2001 | LaRocca et al. | 725/60 |
| 6,701,528 B1* | 3/2004 | Arsenault et al. | 725/89 |
| 6,718,374 B1* | 4/2004 | Del Sordo et al. | 709/220 |
| 6,775,778 B1* | 8/2004 | Laczko et al. | 713/194 |
| 7,073,189 B2 | 7/2006 | McElhatten et al. | |
| 7,107,606 B2* | 9/2006 | Lee | 725/87 |
| 7,155,735 B1* | 12/2006 | Ngo et al. | 725/101 |
| 7,167,895 B1* | 1/2007 | Connelly | 709/203 |
| 7,246,366 B1* | 7/2007 | Addington et al. | 725/93 |
| 7,340,764 B2* | 3/2008 | Kubota et al. | 725/90 |
| 2002/0129375 A1* | 9/2002 | Kim et al. | 725/100 |
| 2002/0133830 A1* | 9/2002 | Kim et al. | 725/142 |
| 2003/0056217 A1 | 3/2003 | Brooks | |
| 2004/0177381 A1 | 9/2004 | Kliger et al. | |
| 2005/0034171 A1 | 2/2005 | Benya | |
| 2005/0160458 A1* | 7/2005 | Baumgartner | 725/46 |
| 2006/0130107 A1 | 6/2006 | Gonder et al. | |
| 2007/0157248 A1* | 7/2007 | Ellis | 725/47 |

OTHER PUBLICATIONS

Cholas et al , U.S. Appl. No. 11/818,236, filed Jun. 13, 2007 titled "Premises Gateway Apparatus and Methods for Use in a Content-Based Network".
Wikipedia, "Quadrature Amplitude Modulation"; http://en.wikipedia.org/wiki/Quadrature_amplitude_modulation; Oct. 23, 2007.

* cited by examiner

*Primary Examiner* — Annan Shang
(74) *Attorney, Agent, or Firm* — Otterstedt, Ellenbogen & Kammer, LLP

(57) ABSTRACT

Video content is transmitted from a head end, over a switched digital video content-based network, to a client. The head end obtains a first group of program streams and sends to the client only a subset of the program streams selected by subscribers in a neighborhood of the client. The video content is contained in a given one of the subset of the program streams and the client is tuned to a channel corresponding to the given one of the subset of the streams. The supplemental information is transmitted from the head end, over the switched digital video content-based network, to the client, based upon the channel to which the client is tuned. The video content and the supplemental information can both be sent on an identical carrier frequency corresponding to the channel; they may employ an identical quadrature amplitude modulation scheme, and the video content can be broken into packets identified via a first packet identifier, with the supplemental information broken into packets identified via a second packet identifier.

21 Claims, 3 Drawing Sheets

APPARATUS AND METHOD FOR PROVIDING VIDEO CONTENT AND SUPPLEMENTAL INFORMATION TO A CLIENT OVER A SWITCHED DIGITAL VIDEO CONTENT-BASED NETWORK

FIELD OF THE INVENTION

The present invention relates generally to communications systems and methods, and, more particularly, to techniques for providing video content and supplemental information to a client over a network such as, for example, a cable television network (or other content network), a wireless network such as a cellular network, a Transmission Control Protocol/Internet Protocol (TCP/IP) network, a DOCSIS® (Data Over Cable Service Interface Specification) network (registered mark of Cable Television Laboratories, Inc., 400 Centennial Parkway Louisville Colo. 80027, USA), and the like.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Video on demand (VOD) systems allow users to select and watch video content over a network. Some VOD systems "stream" content for real-time viewing. Others "download" the content to a set-top box before viewing starts. Use of digital video recorders (DVRs), also known as personal video recorders (PVRs), such as the TiVo® device (registered mark of TiVo Brands LLC, Alviso, Calif.) and the R Replay TV® device (registered mark of Digital Networks North America Inc., Pine Brook, N.J.), is ubiquitous. Such devices may provide some benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" or "trick play" functions) furnished by the DVR.

U.S. Pat. No. 7,073,189 of McElhatten, et al. is entitled "Program guide and reservation system for network based digital information and entertainment storage and delivery system." The disclosure of the aforesaid U.S. Pat. No. 7,073,189 of McElhatten, et al. is expressly incorporated herein by reference in its entirety for all purposes. A "network PVR (NPVR)" (also referred to as an NDVR (Network Digital Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast.

Note that an NDVR can be distinguished from a DVR in that the latter, storage of programs and the like is local to the DVR, while in the former (NDVR) case, such storage is at the server or head end level.

Co-owned and co-pending U.S. patent application Ser. No. 09/956,688 filed Sep. 20, 2001 and entitled "Technique for Effectively Providing Program Material in a Cable Television System", United States Patent Publication 2003-0056217 A1 of Paul D. Brooks, expressly incorporated herein by reference in its entirety for all purposes, describes one exemplary broadcast switched digital architecture. Switching architectures allow improved efficiency of bandwidth use for ordinary digital broadcast programs. Ideally, the subscriber will be unaware of any difference between programs delivered using a switched network and ordinary streaming broadcast delivery.

Various types of functionality can be provided within the set-top box of a subscriber of a cable television system or similar system. In some instances using conventional networks, only limited functionality is provided (a so-called "thin" client) and a session is established with a server to provide additional functionality. One example of this type of prior art system is that available from ICTV, Inc., of San Jose, Calif., USA, www.ictv.com.

SUMMARY OF THE INVENTION

Principles of the present invention provide techniques for providing video content and supplemental information to a client over a switched digital video content-based network. The method includes transmitting the video content from a head end, over the switched digital video content-based network, to the client. The head end obtains a first group of program streams and sends to the client only a subset of the program streams selected by subscribers in a neighborhood of the client. The video content is contained in a given one of the subset of the program streams, and the client is tuned to a channel corresponding to the given one of the subset of the streams. The method also includes transmitting the supplemental information from the head end, over the switched digital video content-based network, to the client, based upon the channel to which the client is tuned.

In some instances, the video content and the supplemental information are both sent on an identical carrier frequency corresponding to the channel; for example, the video content and the supplemental information may employ a substantially identical quadrature amplitude modulation (QAM) scheme, and the video content can be broken into packets identified via a first packet identifier, with the supplemental information broken into packets identified via a second packet identifier.

The supplemental information could be, for example, customized channel map information, video-on-demand catalog data, extended program guide data, an added functionality application, results from public and/or private queries, and/or data for an added functionality application.

In another aspect, a method of providing a targeted video-on-demand catalog to a user of a video content-based network includes the steps of obtaining information about the user, the information being useful in predicting video content which the user may find interesting; developing the targeted video-on-demand catalog, based on the information; and transmitting the targeted video-on-demand catalog to a client associated with the user.

In yet another aspect, a system for providing video content and supplemental information includes a plurality of clients, a switched digital video content-based network, a program material processing unit interconnected to the plurality of clients via the switched digital video content-based network, and a supplemental information processing unit interconnected to the plurality of clients via the switched digital video content-based network. The program material processing unit is configured to obtain a first group of program streams and to send to a given one of the clients only a subset of the program streams selected by subscribers in a neighborhood of the given one of the clients, the video content being contained in a given one of the subset of the program streams, and the given one of the clients being tuned to a channel corresponding to the given one of the subset of the streams. The supplemental information processing unit is configured to send the supplemental information over the switched digital video content-based network, to the given one of the clients, based at least in part upon the channel to which the client is tuned.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. Another example of facilitating includes facilitating transmission of material by assigning an appropriate carrier.

An exemplary embodiment of an apparatus, according to another aspect of the invention, can include a memory and at least one processor coupled to the memory. The processor can be operative to facilitate performance of one or more of the method steps described herein. Non-limiting examples of processors are those on a server in a head end (or elsewhere, such as on a public or private network), a client such as a set top box (STB), and the like. In still another aspect, an apparatus or system can include means for performing the various method steps. The means can include one or more hardware modules, one or more software modules, or a mixture of one or more software modules and one or more hardware modules.

One or more method steps of the present invention can be implemented in the form of an article of manufacture including a machine readable medium that contains one or more programs which when executed implement such step(s).

Techniques of the present invention can provide substantial beneficial technical effects. For example, one or more embodiments of the invention require less memory in a client, such as a set top box, in a switched digital video content-based network. Other technical benefits that may accrue in one or more embodiments of the invention include more efficient use of tuning resources, reduced broadcast traffic and/or bandwidth, less processing and memory required, and/or less latency in acquiring specific data.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
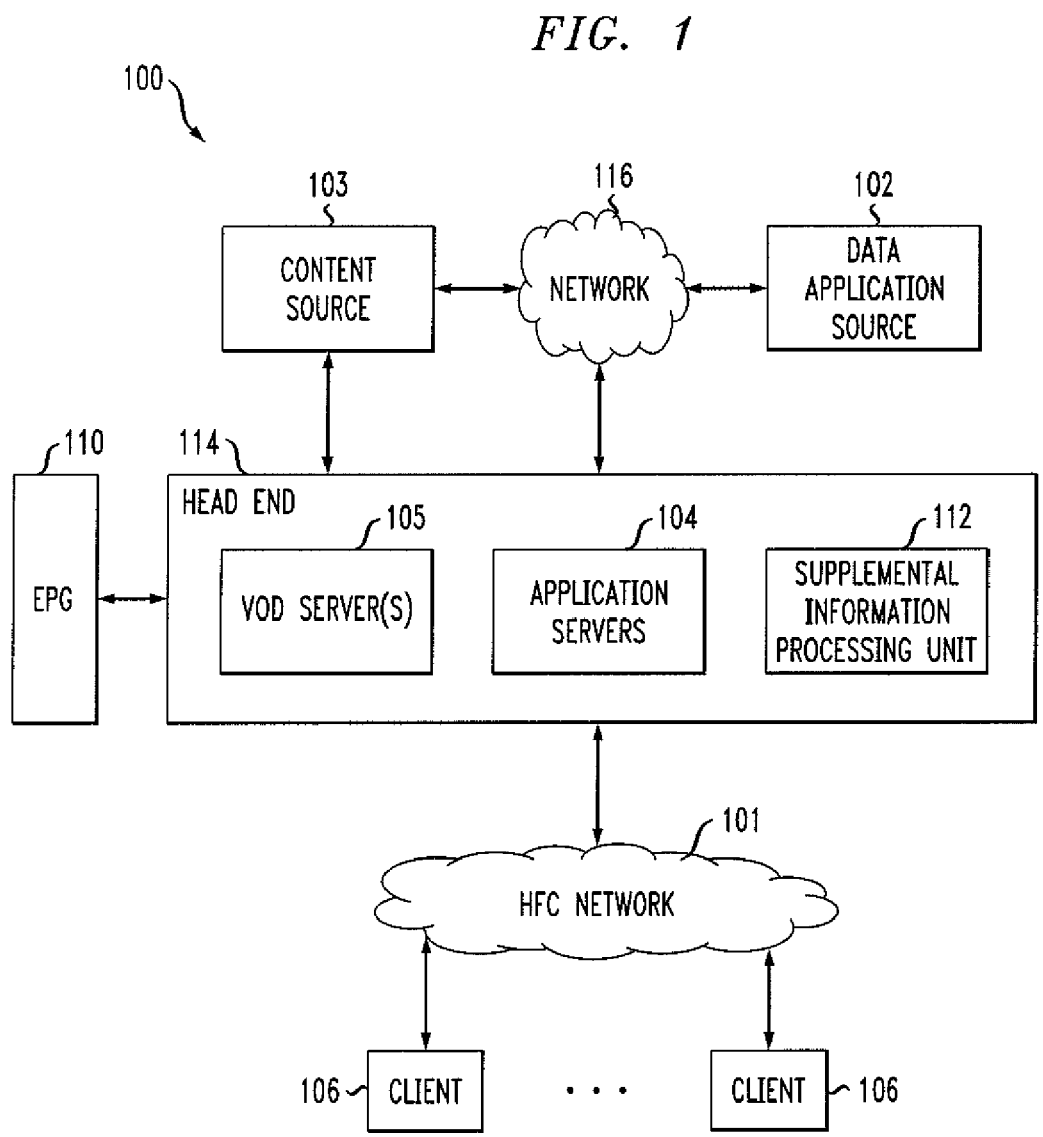
FIG. 1 is a functional block diagram illustrating an exemplary hybrid fiber-coaxial (HFC) cable network configuration useful with the invention.

FIG. 1 illustrates an inventive content-based network configuration with which the apparatus and methods of the present invention may be used. One or more inventive embodiments facilitate delivery of client-specific supplemental information (a non-limiting example of a client is a set-top box) over a switched digital network in an efficient manner. Advantageously, in some instances, existing switched digital networks can be leveraged to provide delivery of supplemental information (other than switched broadcast services), inasmuch as there is knowledge of where the tuner resides for every client; furthermore, in at least some instances, other aspects of the network may be unburdened in order to enhance future services.

The various components of the network 100 include (i) one or more data and application origination points 102; (ii) one or more content sources 103; (iii) one or more application distribution servers 104; (iv) one or more VOD servers 105; and (v) customer premises equipment (CPE) such as clients 106 (for example, set top boxes). The distribution server(s) 104, VOD servers 105 and CPE(s) 106 are connected via a bearer (for example, hybrid fiber coaxial (HFC)) network 101. Also included are a source of electronic programming information (electronic program guide or "EPG") 110 and a supplemental information processing unit 112. Program guide data can be obtained, for example, from an external source such as Tribune Media Services, Inc., described at: http://www.tribunemediaentertainment.com/products/tv_onscreen.shtml, and known to the skilled artisan. Supplemental information processing unit 112 provides supplemental information to clients 106, in accordance with one or more inventive techniques, as will be described hereinafter. Unit 112 is shown as a separate component, but its functionality might instead be incorporated into other components in head end 114 (or in another location). It should be noted that in some instances of the invention, clients 106 may be "thin" clients; however, in other instances, inventive techniques for delivering supplemental information, such as set-top-box-specific data, to a set top box may be employed with clients having full functionality.

Elements 104, 105, 112 can be co-located, for example, in head end 114. A network 116 provides communication between elements 102, 103, and 114. A simple architecture including one of each of the aforementioned components is shown in FIG. 1 for simplicity (except that multiple clients are shown), although it will be recognized that comparable architectures with multiple components, as well as different network topologies, may be utilized consistent with one or more embodiments of the invention.

The data/application origination point 102 can include any medium that allows data and/or applications (such as a VOD-based or "Watch TV" application) to be transferred to a distribution server 104. This can include for example a third party data source, application vendor website, CD-ROM, external network interface, mass storage device (for example, redundant array of independent disks (RAID) system), and so on. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 includes a computer system where such applications can enter the network system. The VOD server 105 includes a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. As noted, one example is a set-top box or set-top terminal of a user (which can also include DVR functionality or be connected to a DVR).

Figure 2:
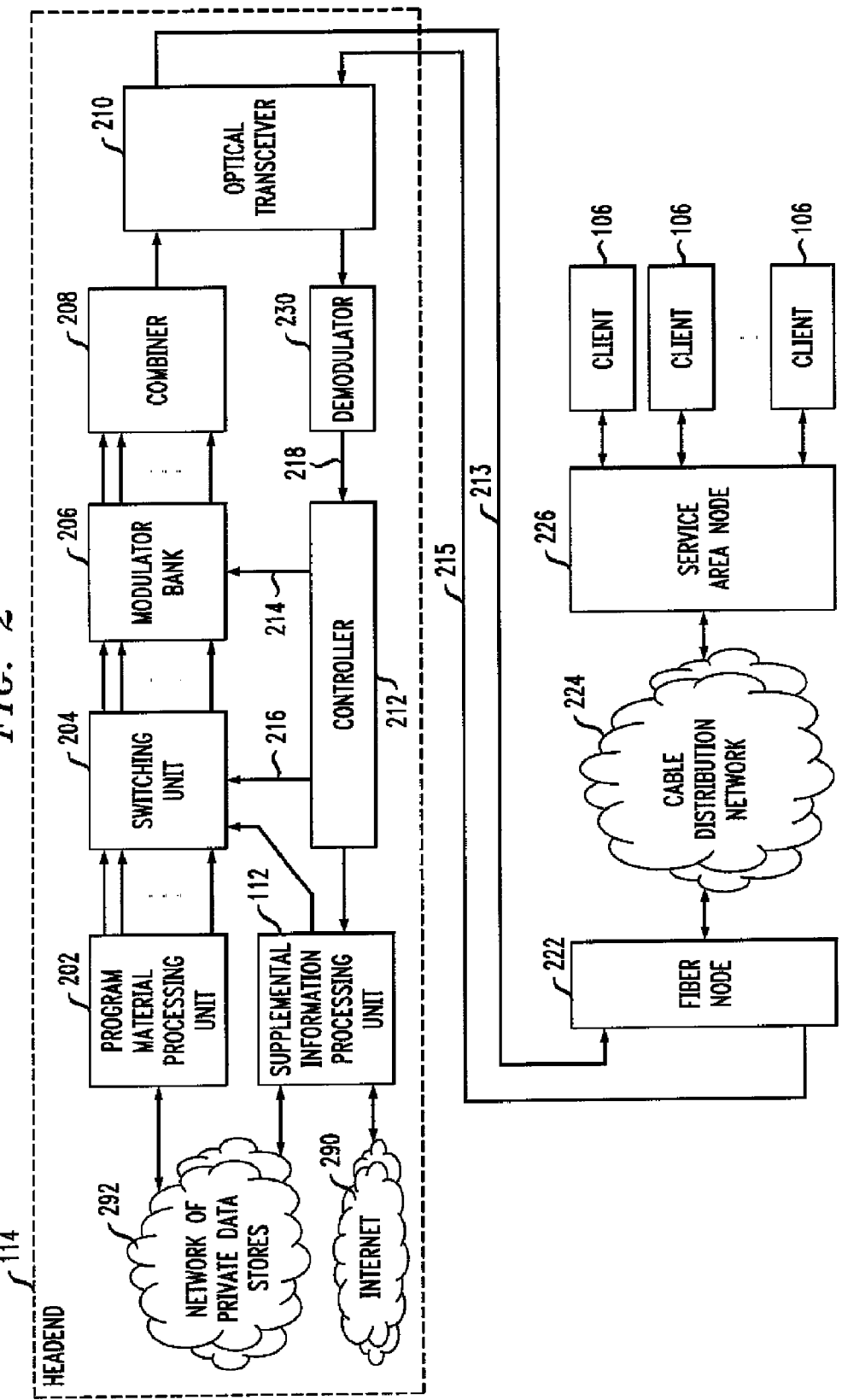
FIG. 2 is a block diagram of an exemplary switched digital broadband communications system in accordance with the invention.

FIG. 2 illustrates a specific form of head end 114, fiber node 222, cable distribution network 224, and service area node 226 which is connected to clients 106 in a neighborhood. Elements 222, 224, 226 correspond to HFC network 101 of FIG. 1.

In head end 114, program material processing unit 202 receives program materials (video source material) from various sources via satellites, terrestrial microwave transmissions, cable, etc., generally represented by the network of private data stores 292. Elements 104 and 105 may be located, for example, within network 292. The program materials are processed by unit 202 to form K individual program data streams in a digital format, where K is an integer. Each program data stream contains program material, which requires a transmission channel having a specified frequency band for its distribution. The term "transmission channel" used here should not be confused with a "program channel." A "transmission channel" signifies a designated frequency band through which a program data stream containing program material is transmitted. On the other hand, a "program channel" signifies the source of the program material selected by a subscriber to view. For example, a subscriber may select program channel 2 to view program material provided by CBS, program channel 14 to view program material provided by ESPN; program channel 32 to view program material provided by MTV, and so on. In this instance, there are K program channels corresponding to the K program data streams.

In some instances, under control of controller 212, switching unit 204 selects and switches a subset of the K program data streams, say, p program data streams, to modulator bank 206, where p is less than or equal to K. Each selected program data stream is transmitted through a different transmission channel after it modulates a carrier associated with the transmission channel in a designated forward passband. As is well known, in the United States the designated forward passband for cable TV ranges from 50 MHz to 550 MHz.

M carriers, $C_1$ through $C_M$, associated with M transmission channels in the forward passband, respectively, may be preselected for use. Since the forward passband is limited in bandwidth, M represents the maximum number of carriers or transmission channels that the forward passband can accommodate. The carrier frequency of $C_1$ is denoted $CF_1$; the carrier frequency of $C_2$ is denoted $CF_2$; . . . ; and the carrier frequency of $C_M$ is denoted $CF_M$. In addition, a control carrier CC having a carrier frequency CCF is assigned to carry control messages by controller 212 to the clients 106 through a control channel in the forward passband.

In instances not employing a switched digital network, each program channel is fixedly assigned to one of the M carriers for transmission of its program material, and all of the program channels are simultaneously made available to each client 106 in a neighborhood. As a result, the number of program channels that can be provided in such a case cannot exceed M. However, the exemplary system of FIG. 2 can dynamically assign carriers to carry program materials of only those program channels selected by the set-top terminals (or subscribers) in a neighborhood. Advantageously, the number of program channels that the switched cable TV (CATV) system can provide, although not simultaneously, can exceed M. That is, K can be greater than M.

Thus, controller 212 communicates to switching unit 204 through link 216, causing unit 204 to switch, to modulator bank 206, the selected p program data streams which contain the program channel materials selected aggregately by the subscribers in the neighborhood. As long as p is less than or equal to M, which is very likely stemming from the fact that the majority at a given time watch only a few particular favorite program channels, controller 212 manages to assign p carriers to carry the respective data streams. To that end, controller 212 also specifies to unit 204 the selected inputs of modulator bank 206 to which the p data streams are switched.

Modulator bank 206 can include, for example, conventional modulators. Each input to modulator bank 206 is fed to a different modulator for modulating the input onto one of the M carriers. The p data streams are switched by unit 204 to the appropriate inputs of modulator bank 206 to be modulated onto the p assigned carriers, resulting in p data signals representing the modulated carriers, respectively. In addition, controller 212 transmits control messages, through link 214 to modulator bank 206, where a modulator modulates the control messages onto the aforementioned control carrier, resulting in a control signal representing the modulated control carrier.

Combiner 208 combines the p data signals and control signal to form a combined signal, which is fed to optical transceiver 210. The latter generates an optical signal representing the combined signal. The optical signal traverses optical fiber 213 to fiber node 222. A transceiver (not shown) in fiber node 222, which performs the inverse function to transceiver 210, converts the optical signal back to the combined signal in electrical form. The combined signal traverses cable distribution network 224 to service area node 226, where the combined signal is multicast to clients 106, such as set-top terminals. A set-top terminal may tune to the control carrier frequency CCF and extract the control signal from the received combined signal. The control signal may contain information identifying the carrier which is assigned to carry the program channel material selected by the set-top terminal. Based on any such information, the set-top terminal tunes to the frequency of the identified carrier and extracts the corresponding data signal from the received combined signal. The selected program channel material is then derived in a well known manner from the extracted data signal for viewing.

Controller 212 may include a processor of conventional design, which can include a memory and a network interface as discussed below with regard to FIG. 4. The processor of controller 212 can receive, from one or more of the clients 106, requests for materials of program channels selected thereby. Such requests are processed by the processor of controller 212 in accordance with routines stored in the memory. The processor of controller 212 may cause switching unit 204 to switch the program data stream corresponding to the requested program channel to a selected input of modulator bank 206 and to assign an unused carrier for transmitting the data stream if the processor has not done so. In addition, the processor transmits a control message receivable by the requesting client, which includes the information identifying the carrier assigned by the processor of controller 212 to carry the requested program channel material. As mentioned before, based on such information, the requesting client tunes to the frequency of the identified carrier to obtain the selected program channel material.

To manage the dynamic assignment of carriers for transmitting requested program channel materials to each neighborhood, an assignment table can be used, and can be stored in the memory of controller 212. Such a table is known to the skilled artisan from the aforementioned United States Patent Publication 2003-0056217 A1 of Paul D. Brooks.

When a subscriber at a client 106 selects a different program channel to watch, a request for material of the newly-selected program channel is sent from the client 106 to controller 212. It should be noted at this point that each of the clients 106 can be pre-assigned with an identifier. The request may include the identity of the client, the newly selected program channel, and the previously-selected program channel.

The above-described request is generated by the requesting client 106, which may incorporate a cable modem for modulating a specified carrier in a reverse passband with the request data. As is well known, in the United States the reverse passband, which ranges from 5 MHz to 42 MHz, is allocated for transmission of signals from clients such as set-top terminals to a head end to realize interactive services. The modulated signal from client 106, representing the request data, is fed to service area node 226, from where it is forwarded to fiber node 222 through cable distribution network 224. In fiber node 222, the aforementioned optical transceiver (not shown) generates an optical signal representing the modulated signal. The optical signal traverses optical fiber 215 to optical transceiver 210 in head end 114. Optical transceiver 210 converts the optical signal back to the modulated signal in electrical form. The modulated signal is then demodulated by demodulator 230 to recover the original request, which is fed to controller 212 through link 218. In response to the received request, controller 212 invokes a first routine stored in its memory.

Instructed by the first routine, the processor of controller 212 reads the received request. If the requested program material is currently not made available to the neighborhood, the processor of controller 212 assigns an unused carrier to carry the requested material, and communicates with switching unit 204, directing it to switch the program data stream associated with the requested program channel to the proper input of modulator bank 206 such that the program channel material is modulated onto the newly-assigned carrier. The processor of controller 212 generates a control message responsive to the received request, which is to be read by the requesting client. The control message includes, among other information, the identity of the client which is the intended recipient of the message, and the identity of the assigned carrier carrying the requested program channel material. The control message is transmitted through the control channel and multicast from service area node 226 to the clients, such as set-top terminals, in the neighborhood. The particular terminal is tuned to the control channel and reads the identifier information in the control message; recognizing that it is the intended recipient of the message, the terminal goes on to read other information in the message including the identity of the assigned carrier carrying its selected program channel material. With the knowledge of the assigned carrier's identity, the terminal tunes to the frequency of the assigned carrier to receive the selected program channel material.

Head end 114 further includes supplemental information processing unit 112. Unit 112 is, in the exemplary embodiment, a peer of unit 202. In some embodiments, the functionality of supplemental information processing unit 112 can be built into program material processing unit 202. Furthermore, the functionality described with regard to unit 112 could also be embodied, in whole or in part, within other components (in head end 114 or elsewhere) or in a stand-alone server. Unit 112 provides, in the exemplary embodiment, a physical entity between data stores and/or application servers (exemplified by network 292) that routes supplemental information to the correct PID. Unit 112 receives requests from clients, obtains material from (for example) the appropriate server, and forwards such material to the correct QAM frequency and PID. Unit 112 is preferably embodied in a process running on a server, but may be thought of as a "black box" that can be implemented using a variety of hardware and/or software techniques.

Unit 112 may receive upstream communications from controller 212. While only a single arrow is depicted from unit 112 to switching unit 204, it should be appreciated that supplemental information intended for many different clients may be provided by unit 112 to unit 204, which will switch the appropriate supplemental information to the appropriate client 106.

Thus, it will be appreciated that an exemplary inventive system for providing video content and supplemental information can include a plurality of clients 106, a switched digital video content-based network of the kind described, a program material processing unit 202 interconnected to the plurality of clients 106 via the switched digital video content-based network, and a supplemental information processing unit 112 interconnected to the plurality of clients via the switched digital video content-based network. The program material processing unit 202 can be configured to obtain a first group of program streams and to send to a given one of the clients 106 only a subset of the program streams selected by subscribers in a neighborhood of the given one of the clients, the video content being contained in a given one of the subset of the program streams, the given one of the clients being tuned to a channel corresponding to the given one of the subset of the streams. The supplemental information processing unit 112 can be configured to send the supplemental information over the switched digital video content-based network, to the given one of the clients 106, based at least in part upon the channel to which the client is tuned. The supplemental information could be obtained by unit 112 from, for example, the Internet 290 and/or a network of private data stores 292.

In one or more inventive embodiments, we use a given client 106 and establish a session back to a server, such as unit 112. One or more embodiments of the invention employ a switched digital network, such as that described with regard to FIG. 2, to be able to switch the information and align the data and/or information with the same physical channel (also referred to as a "QAM") that we are using to send the video to the set top box. Then, we use the client at that point to render both the graphics and/or the information and to display the video, as if a guide were running on the STB (a guide being but one example of the kind of supplemental information that can be provided). Note that use of language such as "we" is not necessarily intended to imply human agency, but also includes steps performed by automated or semi-automated techniques, such as with a computer and the like. Clients 106 can be (but need not be) so-called "thin" clients.

In one aspect of the invention, we use the switched network, such as that described with regard to FIG. 2, to deliver data packets, so that we intelligently "know" what channel the STB or similar client is tuned to (and therefore what QAM it is attached to), and we can thus employ the switching network to switch data packets and/or application data to the box. One or more inventive instances need not employ a dedicated group of channels, as with a switched digital network, one or more of those channels might disappear if not being watched in a given neighborhood. Furthermore, one or more embodiments of the invention can provide the supplemental information on whatever channels are available, resulting in an effective increase in available bandwidth. From a protocol perspective, the data channel can be tied to the same QAM that is being used to deliver the video, so that a single tuner in the STB can obtain both the video and the data. A different PID can be employed within the same QAM so that we can pick those (data) packets out of the stream.

Figure 3:
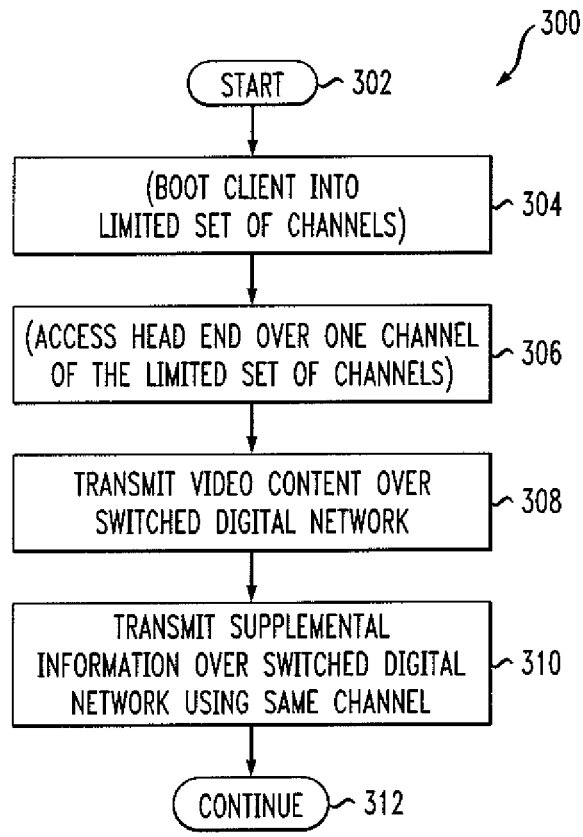
FIG. 3 is a flow chart of an exemplary method of providing video content and supplemental information to a client over a switched digital video content-based network, according to another aspect of the invention.

Thus, with continued reference to FIGS. 1 and 2, reference should now also be had to FIG. 3, which depicts a flow chart 300 of an exemplary inventive method of providing video content and supplemental information to a client 106 over a switched digital video content-based network, such as that shown in FIG. 2. It should be noted that the method steps can be carried out using a variety of systems besides those depicted and mentioned, and that the method is applicable to both pure broadcast and video-on-demand and/or NDVR systems. After beginning at block 302, the method proceeds to optional steps 304 and 306, discussed below. In step 308, one or more components in head end 114 (such as unit 202) transmit the video content to the client 106 over the switched digital network. As described above, the head end 114 obtains a first group of program streams and sends to the client 106 only a subset of the program streams selected by subscribers in the neighborhood of the client 106. The video content is contained in one of the selected subset of program streams. The client is tuned to a channel corresponding to that stream.

In one or more embodiments, the specific QAM frequency is determined by the switched digital video network, and a separate PID is used to supply the supplemental information. Instead of having a broadcast channel only or a video channel only, in one or more embodiments of the invention, there is knowledge regarding the location of the tuner (in a given one of the clients 106, such as a set-top box), since the switched digital network is employed. The tuner may advantageously be implemented such that it is wide enough to tune multiple PIDs without changing frequency; thus, supplemental information can be placed on one PID (with video on another PID) and supplemental information and a video stream can both be delivered to the client 106 on the same QAM frequency.

The supplemental information and video can preferably be switched independently back in the head end 114 (that is, supplemental information and video traffic can be routed independently back in the head end). In one or more embodiments of the invention, a specific session is established between the client 106 and the head end 114, in order to route traffic to the client 106. Inasmuch as, in one or more embodiments of the invention, both supplemental information and video are switched, neither (i) an out-of-band channel with another tuner or (ii) data-delivery across all the different channels are required, because the particular channel someone is tuned to is known to the switched digital network.

In step 310, the supplemental information is transmitted from the head end 114 (for example, from unit 112), over the switched digital video content-based network, to the client 106, based upon the channel to which the client is tuned. In some instances, the video content and the supplemental information are both sent on an identical carrier frequency corresponding to the channel. The video content and the supplemental information can both employ an identical quadrature amplitude modulation (QAM) scheme. The video content can be broken into packets identified via a first packet identifier, and the supplemental information can be broken into packets identified via a second packet identifier. Processing continues at block 312.

The aforementioned supplemental information can include many different types of information; some non-limiting examples follow.

In one aspect, the supplemental information may pertain to a channel map. The box or other client 106 may boot into a small group of channels; one of those channels instructs the client that once two-way communication is accessed, the box should communicate with a server, such as 112, that indicates the box's identity and service associations. The server 112 may then send the box a customized channel map, thereby providing the ability to have a custom channel map for every STB, wherein we only store information for channels applicable to that STB.

Thus, when the supplemental information is customized channel map information, the aforementioned optional steps 304, 306 may be performed. In step 304, client 106 boots into a limited set of channels. In step 306, client 106 accesses the head end 114 over one of the limited set of channels. In step 310, the supplemental information, in this case, customized channel map information, is provided to the client 106 from block 112, in response to the access to the head end 114 over the aforementioned one of the limited set of channels.

Another possible type of supplemental information is video-on-demand catalog data. In one or more embodiments of the invention, we leave the catalog on a server that we have the ability to create a "link" with (either via the switched network of FIG. 2 or some other mechanism), allowing for a fast delivery of the individual channel's VOD catalogs without having to maintain all the data on the STB. The catalog could reside, for example, on a component coupled to unit 112 (for example, in network 292 or on Internet 290), Searching multiple channels for a particular title, and quick switching of the data in and out of the box or other client, are thus facilitated.

In some instances, the linkage between the client and server to access a VOD catalog may be over the switched digital network, while in other instances, another mechanism might be employed. In one or more instances, a list of offerings can be created, customized for each client. That is, rather than just knowing what is available and what is being bought by the general public, a specific list of offerings could be created and targeted towards a specific customer. The VOD catalog of offerings can thus be custom-tailored for each individual client (user).

Thus, in an aspect of the invention, a method of providing a targeted video-on-demand catalog to a user of a video content-based network includes obtaining information about the user, the information being useful in predicting video content which the user may find interesting; developing the targeted video-on-demand catalog, based on the information; and transmitting the targeted video-on-demand catalog to a client associated with the user (such transmission may be facilitated, for example, by a processor assigning a carrier). In some instances, the information can include at least indications of previous content viewed by the user. Further, in some instances, the targeted video-on-demand catalog is transmitted to the user over the video content-based network; the video content-based network is a switched digital video content-based network; and the indications of the previous content viewed by the user are obtained, at least in part, based on identification, via the switched digital video content-based network, of a tuner of the client associated with the user. Stated in another way, a customized VOD catalog could be developed based on some knowledge about the user, such as his or her prior viewing habits; information regarding such habits could be obtained based on knowledge of the tuner in the client 106, which could be used to identify the user and access his or her records, such as billing records.

Yet another possible type of supplemental information is extended program guide data. In one or more inventive embodiments, by accessing unit 112 to obtain the information, we may choose to keep only one or two hours of guide data in the box or other client 106 (say, just enough for immediate display) and we might cache the next day's worth of program guide data, jettison what is not needed, and view guide data as far out into the future as available (from a source such as 110), by paging it in and out.

Still another possible type of supplemental information includes added functionality application(s) and/or their associated data. Such added functionality applications are not necessarily video services—they may include games, news applications, financial ticker applications, sports score applications, and the like. The actual applications, and/or the data used by them, can be sent from head end 114 to the STB or other client 106, using one or more inventive techniques. Thus, the data may include, for example, game data, news data, financial ticker data, sports score data, and the like.

An even further possible type of supplemental information includes results from a query across public and/or private data, for example, from the Internet 290 or network of private data stores 292, respectively. For example, it is possible to have an application to facilitate search of a video database. A VOD system might be connected to a large library of public data, such as titles of films. A customer may want to search for all films a particular actor was in. A public network, such as the Internet 290, can be accessed by unit 112, for example, through some kind of filtered or protected gateway. Pertinent information on the particular actor could be located and sent back. Via appropriate mark-up, a list can be created of the movies the actor was in; the customer clicks on a given one of the movies that the customer wants and a session is created to pull down the pertinent information. In terms of private data, a search page could be created for all the VOD titles on the current network (for example, in the network of private data stores 292), and an interactive search application can be implemented, which allows customers to drill down through a larger catalog of titles.

It should be noted that in some instances, clients 106 may be premises gateway apparatuses, as disclosed in U.S. patent application Ser. No. 11/818,236, of inventors Cholas et al., entitled "Premises gateway apparatus and methods for use in a content-based network," filed on Jun. 13, 2007, the complete disclosure of which is expressly incorporated herein by reference in its entirety for all purposes.

The invention can employ hardware and/or software aspects. Software includes but is not limited to firmware, resident software, microcode, etc. An exemplary embodiment of an inventive apparatus can include a memory and at least one processor coupled to the memory. The processor can be operative to facilitate performance of one or more of the method steps described herein. In another aspect, the apparatus can include means for performing the various method steps. The means can include one or more hardware modules, one or more software modules, or a mixture of one or more software modules and one or more hardware modules (appropriate interconnections via bus, network, and the like can also be included). One or more method steps of the present invention can be implemented in the form of an article of manufacture including a machine readable medium that contains one or more programs that when executed implement such step or steps.

Figure 4:
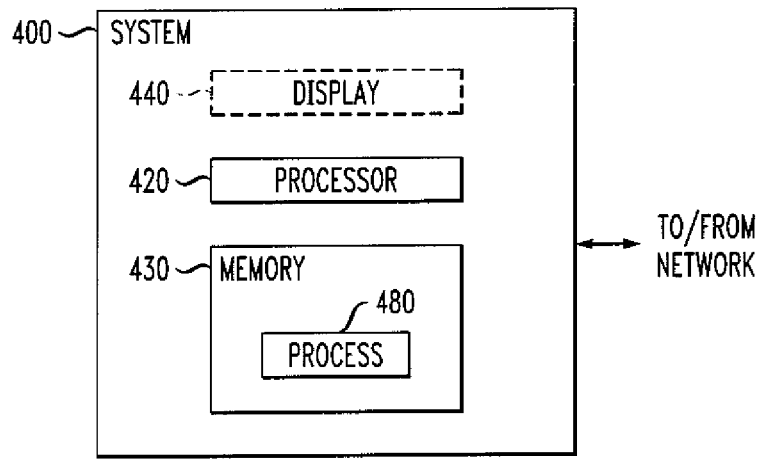
FIG. 4 is a block diagram of a computer system useful in connection with one or more aspects of the invention.

FIG. 4 is a block diagram of a system 400 that can implement part or all of one or more aspects or processes of the present invention, processor 420 of which is representative of processors (such as those in elements 104, 105, 106, 112, 202, 212) depicted in the other figures. In one or more embodiments, inventive steps are carried out by one or more of the processors in conjunction with one or more interconnecting network(s). As shown in FIG. 4, memory 430 configures the processor 420 to implement one or more aspects of the methods, steps, and functions disclosed herein (collectively, shown as process 480 in FIG. 4). The memory 430 could be distributed or local and the processor 420 could be distributed or singular. The memory 430 could be implemented as an electrical, magnetic or optical memory, or any combination of these or other types of storage devices. It should be noted that if distributed processors are employed, each distributed processor that makes up processor 420 generally contains its own addressable memory space. It should also be noted that some or all of computer system 400 can be incorporated into an application-specific or general-use integrated circuit. For example, one or more method steps could be implemented in hardware in an ASIC rather than using firmware. Display 440 is representative of a variety of possible input/output devices.

System and Article of Manufacture Details

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

Accordingly, it will be appreciated that one or more embodiments of the present invention can include a computer program including computer program code means adapted to perform one or all of the steps of any methods or claims set forth herein when such program is run on a computer, and that such program may be embodied on a computer readable medium. Further, one or more embodiments of the present invention can include a computer including code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of providing video content and supplemental information to a client over a switched digital video content-based network, said method comprising the steps of:
   transmitting said video content from a head end, over said switched digital video content-based network, to said client, wherein said head end obtains a first group of program streams and sends to said client only a subset of said program streams selected by subscribers in a neighborhood of said client, said video content being contained in a given one of said subset of said program streams, said client being tuned to a channel corresponding to said given one of said subset of said streams; and
   transmitting said supplemental information from said head end, over said switched digital video content-based network, to said client, based at least in part upon said channel to which said client is tuned;
   wherein:
   said video content and said supplemental information are both sent on an identical carrier frequency corresponding to said channel; and
   said video content and said supplemental information employ a substantially identical quadrature amplitude modulation scheme, said video content is broken into packets identified via a first packet identifier, and said supplemental information is broken into packets identified via a second packet identifier.

2. The method of claim 1, wherein said supplemental information comprises customized channel map information, further comprising the additional steps of:
   booting said client into a limited set of channels; and
   accessing said head end over a given one of said limited set of channels;
   wherein said customized channel map information is provided to said client in response to said access to said head end over said given one of said limited set of channels.

3. The method of claim 1, wherein said supplemental information comprises video-on-demand catalog data.

4. The method of claim 3, wherein said video-on-demand catalog data comprises a targeted video-on-demand catalog provided to a user of said switched digital video content-based network, further comprising the additional steps of:
   obtaining information about said user, said information being useful in predicting video content which said user may find interesting; and
   developing said targeted video-on-demand catalog, based on said information;
   wherein said transmitting step comprises transmitting said targeted video-on-demand catalog to said client, said client being associated with said user.

5. The method of claim 4, wherein said information comprises at least indications of previous content viewed by said user.

6. The method of claim 5, wherein:
   said indications of said previous content viewed by said user are obtained, at least in part, based on identification, via said switched digital video content-based network, of a tuner of said client associated with said user.

7. The method of claim 1, wherein said supplemental information comprises extended program guide data.

8. The method of claim 1, wherein said supplemental information comprises an added functionality application.

9. The method of claim 8, wherein said added functionality application comprises one of a game, a news application, a financial ticker application, and a sports score application.

10. The method of claim 1, wherein said supplemental information comprises data for an added functionality application.

11. The method of claim 10, wherein said data comprises one of game data, news data, financial ticker data, and sports score data.

12. The method of claim 1, wherein said supplemental information comprises results from querying public data.

13. The method of claim 1, wherein said supplemental information comprises results from querying private data.

14. A system for providing video content and supplemental information, comprising:
   a plurality of clients;
   a switched digital video content-based network;
   a program material processing unit interconnected to said plurality of clients via said switched digital video content-based network, said program material processing unit being configured to obtain a first group of program streams and to send to a given one of said clients only a subset of said program streams selected by subscribers in a neighborhood of said given one of said clients, said video content being contained in a given one of said subset of said program streams, said given one of said clients being tuned to a channel corresponding to said given one of said subset of said streams; and a supplemental information processing unit interconnected to said plurality of clients via said switched digital video content-based network, said supplemental information processing unit being configured to send said supplemental information over said switched digital video content-based network, to said given one of said clients, based at least in part upon said channel to which said client is tuned;

wherein:

said video content and said supplemental information are both sent on an identical carrier frequency corresponding to said channel; and said video content and said supplemental information employ a substantially identical quadrature amplitude modulation scheme, said video content is broken into packets identified via a first packet identifier, and said supplemental information is broken into packets identified via a second packet identifier.

15. The system of claim 14, wherein:

said supplemental information comprises customized channel map information;

said given one of said clients is booted into a limited set of channels;

said program material processing unit and said supplemental information processing unit are associated with a head end;

said given one of said clients accesses said head end over a given one of said limited set of channels; and said customized channel map information is provided to said given one of said clients in response to said access to said head end over said given one of said limited set of channels.

16. The system of claim 14, wherein said supplemental information comprises video-on-demand catalog data.

17. The system of claim 16, wherein said video-on-demand catalog data comprises a targeted video-on-demand catalog provided to a user of said switched digital video content-based network, wherein said supplemental information processing unit is operative to:

obtain information about said user, said information being useful in predicting video content which said user may find interesting;

develop said targeted video-on-demand catalog, based on said information; and facilitate transmission of said targeted video-on-demand catalog to a client associated with said user.

18. The system of claim 14, wherein said supplemental information comprises extended program guide data.

19. The system of claim 14, wherein said supplemental information comprises at least one of an added functionality application and data for said added functionality application.

20. The system of claim 14, wherein said supplemental information comprises results from querying at least one of public and private data.

21. An apparatus for providing video content and supplemental information to a client over a switched digital video content-based network, said apparatus comprising:

means for transmitting said video content from a head end, over said switched digital video content-based network, to said client, wherein said head end obtains a first group of program streams and sends to said client only a subset of said program streams selected by subscribers in a neighborhood of said client, said video content being contained in a given one of said subset of said program streams, said client being tuned to a channel corresponding to said given one of said subset of said streams; and means for transmitting said supplemental information from said head end, over said switched digital video content-based network, to said client, based at least in part upon said channel to which said client is tuned;

wherein:

said video content and said supplemental information are both sent on an identical carrier frequency corresponding to said channel; and said video content and said supplemental information employ a substantially identical quadrature amplitude modulation scheme, said video content is broken into packets identified via a first packet identifier, and said supplemental information is broken into packets identified via a second packet identifier.

* * * * *